United States Patent [19]

Simmons

[11] 3,972,499
[45] Aug. 3, 1976

[54] HANGER FOR ATTACHING ITEMS TO A CHAIN LINK TYPE FENCE

[76] Inventor: George H. Simmons, 4660 Paradise Drive, Tiburon, Calif. 94920

[22] Filed: Oct. 21, 1974

[21] Appl. No.: 516,425

[52] U.S. Cl. .............................. 248/224; 248/304
[51] Int. Cl.² .................................... F16B 45/00
[58] Field of Search .......... 248/215, 211, 213, 214, 248/217, 223–225, 301, 303–308, 322, 339–341, DIG. 3

[56] References Cited
UNITED STATES PATENTS

| | | | |
|---|---|---|---|
| 1,722,383 | 7/1929 | Merk | 248/304 |
| 3,218,018 | 11/1965 | Pusch et al. | 248/340 |
| 3,260,489 | 7/1966 | Hentzi | 248/215 |
| 3,561,718 | 2/1971 | Iverson | 248/301 |
| 3,612,459 | 10/1971 | Walls | 248/215 |
| 3,854,689 | 12/1974 | Engels | 248/340 |
| 3,891,176 | 6/1975 | Downing et al. | 248/340 |

FOREIGN PATENTS OR APPLICATIONS

| | | | |
|---|---|---|---|
| 736,820 | 6/1966 | Canada | 248/DIG. 3 |
| 908,626 | 10/1945 | France | 248/301 |
| 302,776 | 12/1928 | United Kingdom | 248/215 |

Primary Examiner—Lawrence J. Staab

[57] ABSTRACT

This invention relates to a unique, improved, inexpensive, one-piece garment or equipment hanger which can be securely attached to the diagonal rod or wire, of which the common chain link type fence is constructed; and this hanger can be formed of such size and shape that it may be inserted along with the tennis balls at the ball packaging facility.

2 Claims, 4 Drawing Figures

HANGER FOR ATTACHING ITEMS TO A CHAIN LINK TYPE FENCE

BRIEF SUMMARY

I have illustrated herein and shall hereinafter describe my invention as adapted to the game of tennis solely for purposes of explanation and brevity, but it is to be understood that this hanger can be used for hanging upon the wires or rods many items wherever chain link fences, dividers, or enclosures (in either left or right hand weave) are available; and it is to be further understood that it can be constructed of many different materials rather than the impact styrene as shown in the drawings. Also it can be so designed in a plurality of shapes, sizes and colors.

Due to the great expansion and current public interest in the game of tennis, participants and spectators alike experience unnecessary difficulty in finding a place to put their garments and equipment while waiting to play the game of tennis. Participants and spectators find it necessary to place clothing, equipment, and personal items on the ground, benches, or ends of the net. Hangers formerly developed and as shown in the following patents:

Spencer, Great Britain Pat. No. 302,776
Hentzi, U.S. Pat. No. 3,260,489
Walls, U.S. Pat. No. 3,612,452 are designed to be attached to a horizontal, rectangular support and consequently are inefficient when attempts are made to utilize them on a small rounded diagonal support. Since there are no hangers provided, the present invention is directed at relieving the foregoing condition.

A primary object of my invention is to provide a secure one-piece, safe, rounded oxidation-free hanger to suspend above the ground or floor level any items commonly used in and around tennis matches or other places where varying size and mesh of chain link type fencing is available.

Another important object of my invention is to elevate either singularly or simultaneously purses, racquets, presses, towels, warm-up suits, caps, jackets and other valuable equipment to a position on the fence where they can be more easily visually guarded from theft.

A further object of my hanger invention is to display clothes and equipment more clearly so that they may not be overlooked when leaving the court area.

An additional object of my invention is a hanger which will protrude and be securely held in a cantilevered position 90° from the plane of the fence so that garments and equipment may be suspended but in a position not in contact with the fence.

A still further object of my invention is to provide a safe storage place for tennis racquets eye glasses and other equipment which can be otherwise bent or damaged if sat upon or stepped upon during the course of a game by either participants or spectators.

An additional object of my invention is to provide a safety contoured hanger of such a size and shape that it can be inserted within the normal ball can or container along with the balls at the packaging or canning facility or be placed in a pocket for convenience of storage.

Another object of my invention is to provide a dry, clean area above the ground level for purses, towels, clothing and other equipment such as information signs, clocks, and tool holders.

Also an object of my invention is to provide a hanger of such a size and shape that it will enable a person or company to place their names in a variety of colors thereon for identification, advertising, or other reasons.

DETAILED DESCRIPTION

Figure 1:
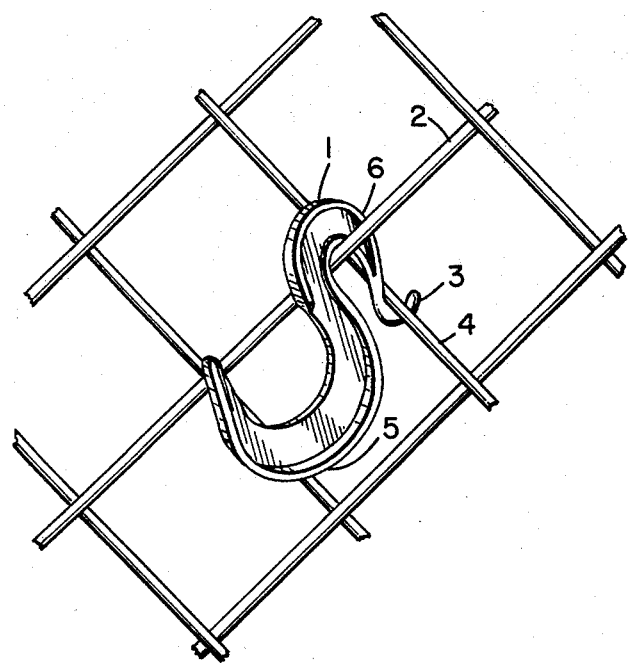
FIG. 1 is a perspective view drawn on a reduced scale and attached in working position, absent the suspended article.

FIG. 1 shows a partial side view of the hanger as it would appear in a perpendicular position to the ground level while attached to a section of fence. No attempt has been made to show precisely the construction of the common chain link type fence but rather only the necessary intersection of the wires. Point 1 is the section of the hanger which rests upon diagonal wire 2. Point 3 is the hook or stop which engages the next lower extension of wire (diagonal) 4 (which has been displaced approximately 90° by bending.) by encircling it partially from the underneath side. Section 5 is the hook or hanger space for suspending items or imprinting. Point 6 shows the connecting arm between the top of the hanger and the stop 3.

Figure 2:
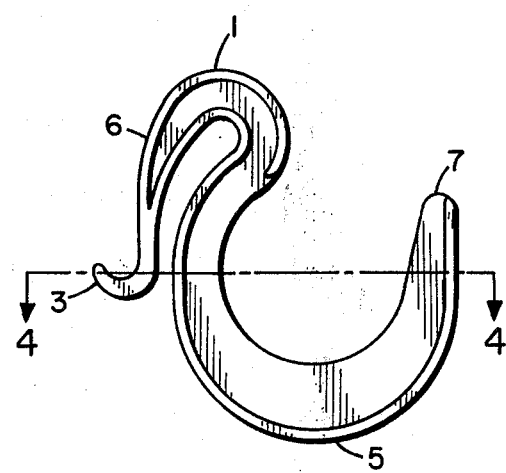
FIG. 2 is a full scale side view of my hook or hanger.

FIG. 2 is a full scale side view of my hook or hanger showing all of the previous parts and points as mentioned under FIG. 1, with the addition of Point 7 which is the rounded tip or uppermost hanging point.

Figure 3:
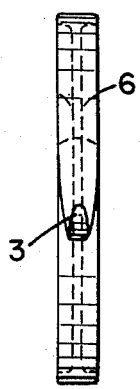
FIG. 3 is a full scale rear view of the hanger showing construction of the hanger.

FIG. 3 is a full scale rear view showing the construction of the hanger.

Figure 4:
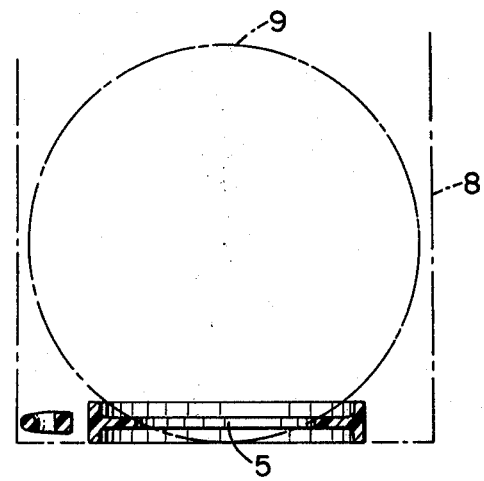
FIG. 4 is a phantom view of a tennis ball within a can and showing my hanger therein in a horizontal position.

FIG. 4 shows the full scale hanger in a horizontal position in the bottom of the conventional tennis ball can 8. A tennis ball 9 is shown resting upon the hanger section 5.

From the description of the invention, it will be apparent to those schooled in the art that various modifications and changes may be made without departing from the scope of the invention as shown in the illustrated embodiment; therefore I claim as new and desire Letters Patent for:

1. A releasable hanger for hooking over and engaging diagonal rod or wire sections, the hanger being of serpentine shape and fabricated with a U-shaped cantilever arm of inverted T cross-sectional construction, blunted at the upper tip, and having an expanded bight for maintaining vertical loads; the rearward portion of the cantilevered arm being extended into a narrow inverted U-shaped, load-bearing hook of T cross-sectional construction, which then extends downward and terminates in a beveled rearward-facing J-shaped hook which has its throat curved to engage the next lower major extension or diagonal wire or rod, said load-bearing look being narrower at the mouth of its U-shape than at the bight of its U-shape, whereby a diagonal rod or wire section may be captured therein.

2. A hanger as described in claim 1 to be constructed of a size and shape that it can be placed in the normal tennis ball can or other container along with the tennis balls at the packaging facility.

* * * * *